(12) United States Patent
Masuda et al.

(10) Patent No.: US 10,921,451 B2
(45) Date of Patent: Feb. 16, 2021

(54) LASER DEVICE

(71) Applicant: Funai Electric Co., Ltd., Osaka (JP)

(72) Inventors: Yuichiro Masuda, Takatsuki (JP); Yasuo Masaki, Osaka (JP); Manabu Murayama, Itami (JP)

(73) Assignee: Funai Electric Co., LTD., Osaka (JP)

( * ) Notice: Subject to any disclaimer, the term of this patent is extended or adjusted under 35 U.S.C. 154(b) by 567 days.

(21) Appl. No.: 15/785,903

(22) Filed: Oct. 17, 2017

(65) Prior Publication Data

US 2018/0136333 A1 May 17, 2018

(30) Foreign Application Priority Data

Oct. 17, 2016 (JP) .............................. JP2016-203469

(51) Int. Cl.
*G01S 17/42* (2006.01)
*G01S 17/58* (2006.01)
*G01S 7/481* (2006.01)
*G01S 7/48* (2006.01)

(52) U.S. Cl.
CPC ............ *G01S 17/42* (2013.01); *G01S 7/4802* (2013.01); *G01S 7/4817* (2013.01); *G01S 17/58* (2013.01)

(58) Field of Classification Search
CPC ......... G01S 17/42; G01S 17/58; G01S 7/4802
See application file for complete search history.

(56) References Cited

U.S. PATENT DOCUMENTS

| | | | | |
|---|---|---|---|---|
| 8,752,969 B1* | 6/2014 | Kane | .................... | G02B 7/1821 359/872 |
| 8,989,944 B1* | 3/2015 | Agarwal | ............... | G01S 13/588 701/23 |
| 2013/0242285 A1 | 9/2013 | Zeng | | |
| 2015/0124238 A1* | 5/2015 | Sakai | .................... | G01S 7/4815 356/4.01 |
| 2016/0040979 A1* | 2/2016 | Takiguchi | ............... | G01S 17/42 356/614 |
| 2017/0273161 A1* | 9/2017 | Nakamura | ............ | G01S 17/931 |

FOREIGN PATENT DOCUMENTS

| | | |
|---|---|---|
| DE | 10 2008 019 615 A1 | 11/2009 |
| EP | 2 921 877 A2 | 9/2015 |
| JP | 2012-225821 A | 11/2012 |

OTHER PUBLICATIONS

Extended European Search Report in counterpart European Application No. 17 19 6666.6 dated Feb. 27, 2018 (6 pages).

* cited by examiner

*Primary Examiner* — Eric L Bolda

(74) *Attorney, Agent, or Firm* — Osha Bergman Watanabe & Burton LLP

(57) ABSTRACT

A laser device includes a light source that emits light; a first reflector that reflects the light toward a predetermined range; a second reflector that reflects the light reflected from the predetermined range; a light receiver that receives the light reflected by the second reflector; a driver that swings the first and the second reflector in an angular range corresponding to the predetermined range; and a calculator that: stores first information about the light reflected by the first reflector toward the predetermined range and second information about the light received by the light receiver; and measures movement speed and movement direction of a target reflecting the light from the first reflector based on the first and the second information.

14 Claims, 9 Drawing Sheets

FIG. 9

Timestamp example output

※ Output time information (time stamp) for each scanning angle during one scanning operation

| Scan No. | Optical scanning angle (degrees) | | | | | | |
|---|---|---|---|---|---|---|---|
| | −45 | −44 | −43 | ... | +43 | +44 | +45 |
| 1 | D11:T101 | D12:T102 | D13:T103 | ... | D188:T189 | D189:T190 | D190:T191 |
| 2 | D21:T201 | D22:T202 | D23:T203 | ... | D288:T289 | D289:T290 | D290:T291 |
| 3 | D31:T301 | D32:T302 | D33:T303 | ... | D388:T389 | D389:T390 | D390:T391 |
| 4 | D41:T401 | D42:T402 | D43:T403 | ... | D488:T489 | D489:T490 | D490:T491 |
| 5 | D51:T501 | D52:T502 | D53:T503 | ... | D588:T589 | D589:T590 | D590:T591 |
| 6 | D61:T601 | D62:T602 | D63:T603 | ... | D688:T689 | D689:T690 | D690:T691 |
| ⋮ | ⋮ | ⋮ | ⋮ | | ⋮ | ⋮ | ⋮ |

[Content of output data in one scanning operation]
Distance information for each angle... 91 + Time information for each angle... 91

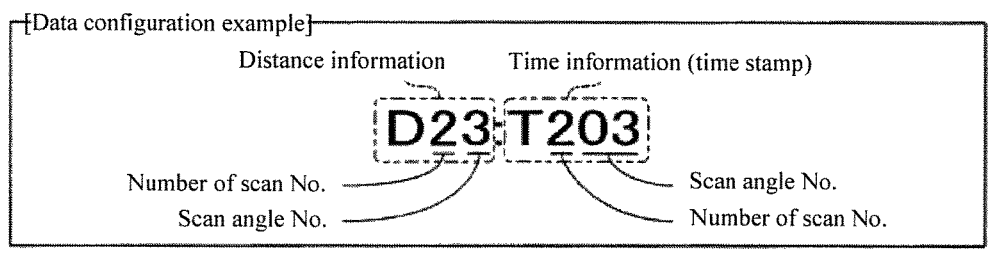

[Data configuration example]
Distance information — Time information (time stamp)
D23:T203
Number of scan No. — Scan angle No.
Scan angle No. — Number of scan No.

LASER DEVICE

BACKGROUND OF THE INVENTION

Technical Field

The present invention relates to a laser device, and particularly relates to a laser device provided with a first reflective part for reflecting emitted light from a light source part toward a predetermined range, and a second reflective part for reflecting the reflected light from the predetermined range.

Related Art

Conventionally, a laser device provided with a first reflective part and a second reflective part is known (for example, see patent literature 1).

Patent literature 1 discloses a laser sensor device (laser device) provided with a laser projector for emitting measurement laser light (emitted light), a photodetector for receiving returned laser light (reflected light) from a measurement target object, a polygon mirror rotationally driven by a rotation motor, and a distance calculator. The laser device described in patent literature 1 is configured so that the measurement laser light is irradiated to the circumferential surface (reflective surface) of the polygon mirror during rotation and is emitted toward the measurement target area (predetermined range), and the returned laser light from the measurement target object is reflected by the circumferential surface (light reception surface) of the polygon mirror during rotation and guided to the light receiver. Note that the measurement laser light is scanned in a prescribed angular range within the measurement target area along with the pivoting (rotation) of the circumferential surface of the polygon mirror. Furthermore, the light receiver has a role of outputting light reception timing information to the distance calculator when returned laser light is received during scanning. In the distance calculator, the distance from the laser sensor device to the measurement target object is calculated based on emission timing information of the measurement laser light emitted from the laser projector and the light reception timing information from the light receiver. Thus, the laser sensor device is configured so that the position and shape of the measurement target object within the measurement target area is obtained based on the distance information to the measurement target object.

Patent Literature

[Patent Literature 1] Japanese Unexamined Application Publication No. 2012-225821

SUMMARY

The laser sensor device described in patent literature 1 can carry out distance measurement for a measurement target object that is stopped or is moving at a relatively slow speed because a polygon mirror is rotated using a rotation motor. However, when the measurement target is expanded to be measured by motion analysis (such as gait analysis) of a measurement target object having a more quick movement such as detailed movement of the leg part while a human is walking, in a method for obtaining distance information from the reflected light of the measurement laser light by rotating the polygon mirror, it is thought that a sufficient sampling number cannot be obtained (amount of distance information) for reasons such as a limitation occurring in the rotation speed caused by the weight of the polygon mirror itself. That is, the laser sensor device described in patent literature 1 cannot obtain a resolution (ability to measure and identify physical quantities) that is compatible with gait analysis and the like.

With the foregoing in mind, one or more embodiments of the invention provides a laser device that can have a resolution compatible with gait analysis and the like by obtaining a sufficient sampling number (amount of measurement information).

The laser device according to one or more embodiments of the present invention is provided with: a light source part; a first reflective part for reflecting light from the light source part to a predetermined range; a second reflective part for reflecting reflected light from the predetermined range; a light receiving part for receiving reflected light from the second reflective part; a drive part for swinging the first reflective part and the second reflective part in an angular range corresponding to the predetermined range; and a measurement part for storing information of light reflected from the first reflective part toward the predetermined range, and for measuring the movement speed and movement direction of a target reflecting the light, based on the stored light information and light reception information of the reflected light received by the light receiving part.

The laser device according to one or more embodiments of the invention is provided with: a drive part for swinging the first reflective part and the second reflective part in an angular range corresponding to the predetermined range; and a measurement part for storing information of light reflected from the first reflective part toward the predetermined range and for measuring the movement speed and movement direction of a target reflecting the light, based on the stored light information and light reception information of the reflected light received by the light receiving part. Thus, for example, unlike the configuration in which the polygon mirror rotates using the rotation motor, the first reflective part and the second reflective part can be reciprocally oscillated (rocked) at a high frequency (oscillation frequency). Therefore, it is possible to understand the state change of the target object (for example detailed movement of a leg part while a human is walking and the like) having a quicker movement, while obtaining a sufficient sampling number (amount of measurement information) from the measurement part. As a result, it is possible to provide a laser device having a resolution (ability to measure and identify physical quantities) compatible with gait analysis and the like.

In the laser device according to one or more embodiments of the present invention, the light reception information may include light reception time and light reception angle of the reflected light received by the light receiving part. According to such a configuration, it is possible to accurately measure the movement speed and movement direction of the target reflecting the light by effectively using the light reception time and the light reception angle of the reflected light received by the light receiving part.

In the laser device according to one or more embodiments of the present invention, the measurement part may store time information of the light for each predetermined swinging angle of the first reflective part. According to such a configuration, because it can configure the information of the light reflected from the first reflective part toward the predetermined range based on the time information of the light for each prescribed swinging angle of the first reflective part, it is possible to accurately measure the movement speed and the movement direction of the target reflecting the light based on the time information of light for each prescribed swinging angle of the first reflective part and the light reception information of the reflected light received by the light receiving part. That is, compared to when time information of the light (time stamp) is only given once during one scan (scanning operation), it is possible measure reliably and in detail the state change of the target object (for example, detailed movement of the leg part (left and right foot) of a pedestrian) based on the time information (time stamp) of a plurality of lights given at prescribed swinging angle increments (for example, every 1 degree) during one scan (during a scanning operation).

The laser device according to one or more embodiments of the present invention may be further provided with a controller for adjusting an amount of light emitted from the light source part based on movement speed and movement direction of the target. According to such a configuration, because the amount of emitted light emitted from the light source part is suitably adjusted by the controller according to the distance from the laser device to the target object during movement, it is possible to emit emitted light toward the scanning region under optimal conditions according to the distance from the laser device to the target object. Therefore, the measurement accuracy (sensitivity) of the state change of the target object can be maintained high.

The laser device according to one or more embodiments of the present invention may be further provided with a controller for adjusting a signal based on reflected light received by the light receiving part, based on movement speed and movement direction of the target. According to such a configuration, because the signal based on reflected light received by the light receiving part is suitably adjusted by the controller according to the distance from the laser device to the target object during movement, it is possible to receive reflected light from the target object under optimal conditions according to the distance from the laser device to the target object. Therefore, the measurement accuracy (sensitivity) of the state change of the target object can be maintained high.

In the configuration further provided with a controller for adjusting an amount of light emitted from the light source part based on movement speed and movement direction of the target, the controller may change the sensing condition based on an irradiation range of light for the predetermined range. According to such a configuration, it is possible to always understand in high measurement accuracy (sensitivity) the state change of a target object, which is quick and detailed in movement.

In the configuration further provided with a controller for adjusting an amount of light emitted from the light source part based on movement speed and movement direction of the target, the controller may carry out at least one of either controlling the amount of light when the distance to the target is a first distance to be greater than the amount of light when the distance to the target is a second distance that is smaller than the first distance, or controlling a signal based on the reflected light when the distance to the target is the first distance to be greater than a signal based on the reflected light when the distance to the target is the second distance. According to such a configuration, it is possible to increase at least one of either signal based on the amount of light or reflected light as the distance from the laser device to the target object increases. Conversely, it is possible to reduce at least one of either signal based on the amount of light or reflected light as the distance from the laser device to the target object decreases. As a result, it is possible to maintain the measurement accuracy (sensitivity) of the laser device at a constant level regardless of distance to the target object.

In the laser device according to one or more embodiments of the present invention, the first reflective part may be disposed lower in the vertical direction than the second reflective part. According to such a configuration, when, for example, the laser device of one or more embodiments of the present invention is placed on a floor surface on which a pedestrian walks and the state change of the target object (for example, movement and the like of the leg part (left and right foot) of the pedestrian) is measured, it is possible to easily emit a light for scanning (emitted light) toward a region corresponding to a position slightly higher than the floor surface. Therefore, it is possible to reliably measure the state change of the target object (for example, detailed movement and the like of the leg part (left and right foot) of a pedestrian) moving quickly near the floor surface.

In the laser device according to or more embodiments of the present invention, a swinging angular range of the first reflective part and the second reflective part may be 90 degrees or greater, and a resonance frequency of the first reflective part and the second reflective part may be no less than 100 Hz and no greater than 500 Hz. According to such a configuration, it is possible to reliably measure the state change of a target object, which is quicker and more detailed in movement. That is, the laser device in one or more embodiments of the present invention can be widely used not only for detailed movement of the leg part (left and right foot) of a pedestrian (human), but also for measurement of a state change of a target object requiring a higher resolution, such as detecting the presence or absence of invasion of a small animal (vermin) in a specific area.

According to one or more embodiments of the present invention, as described above, it is possible to provide a laser device that can have a resolution compatible with gait analysis and the like by obtaining a sufficient sampling number (amount of measurement information).

BRIEF DESCRIPTION OF THE DRAWINGS

FIG. 9 is a diagram for describing the content of the data output in the gait measurement operation of a pedestrian carried out using the motion sensing device according to one or more embodiments of the present invention.

DETAILED DESCRIPTION

Embodiments embodying the present invention will be described below based on drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, the configuration of a motion sensing device 120 according to one or more embodiments of the present invention will be described with reference to FIG. 1 to FIG. 6. Note that the motion sensing device 120 is one example of the "laser device" in the scope of claims.

(Schematic Configuration of the Motion Sensing Device)

Figure 1:
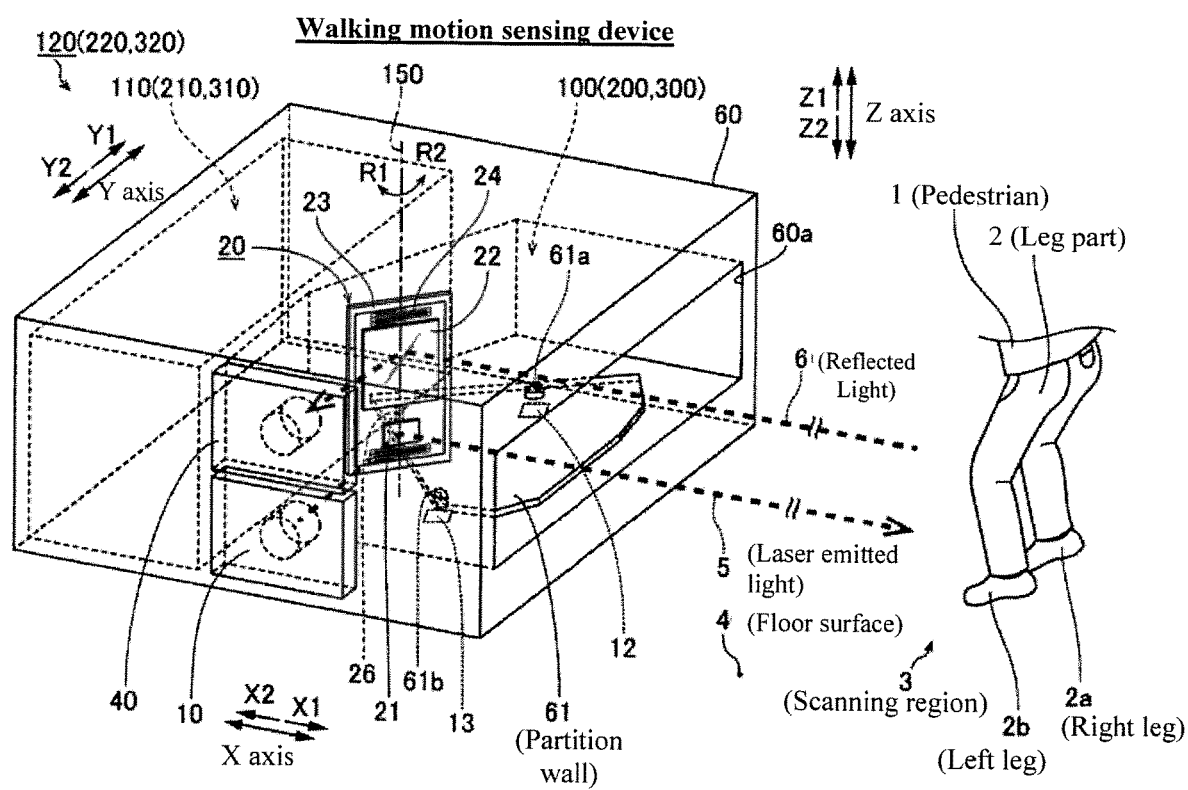
FIG. 1 is a perspective view illustrating a schematic configuration of the motion sensing device according to one or more embodiments of the present invention.
Figure 2:
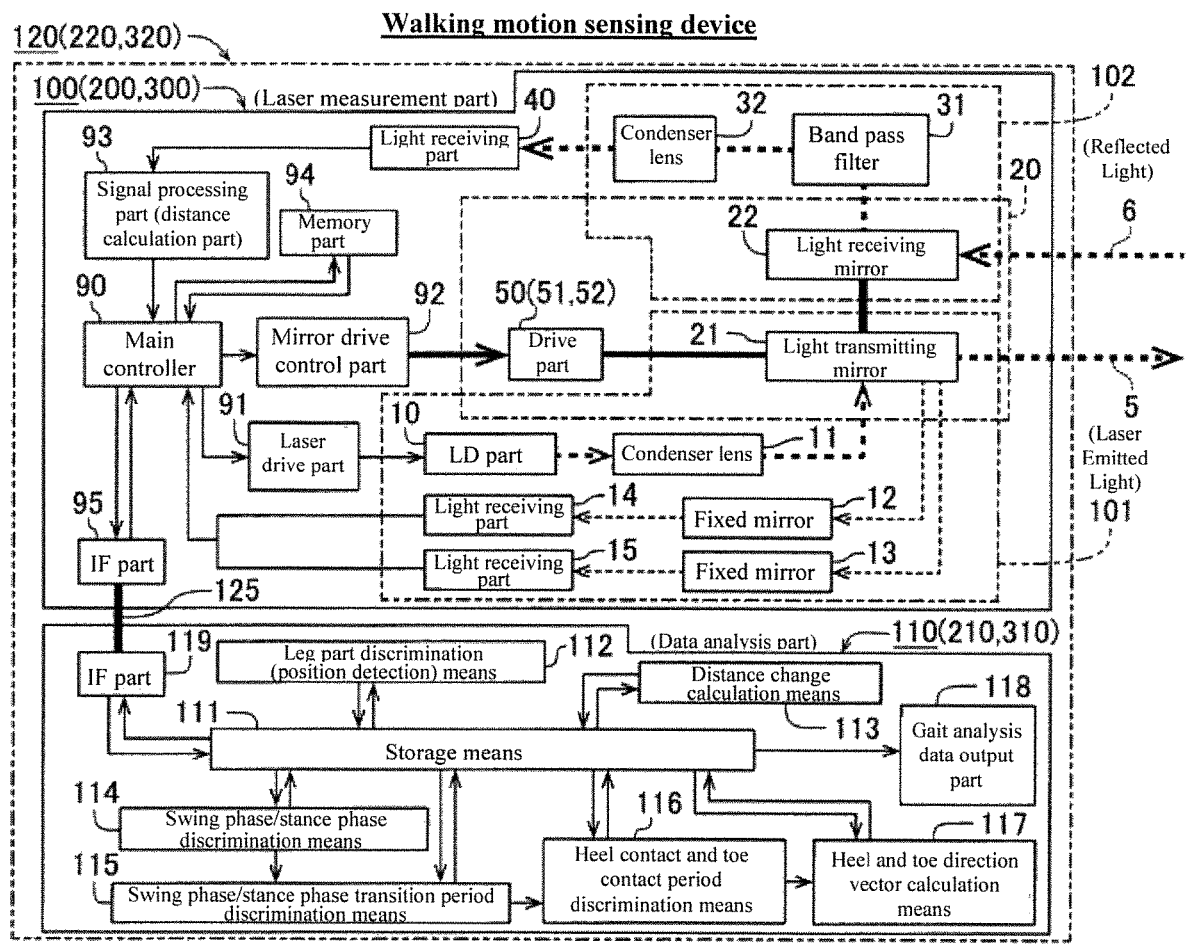
FIG. 2 is a block diagram illustrating a configuration of the motion sensing device according to one or more embodiments of the present invention.
Figure 5:
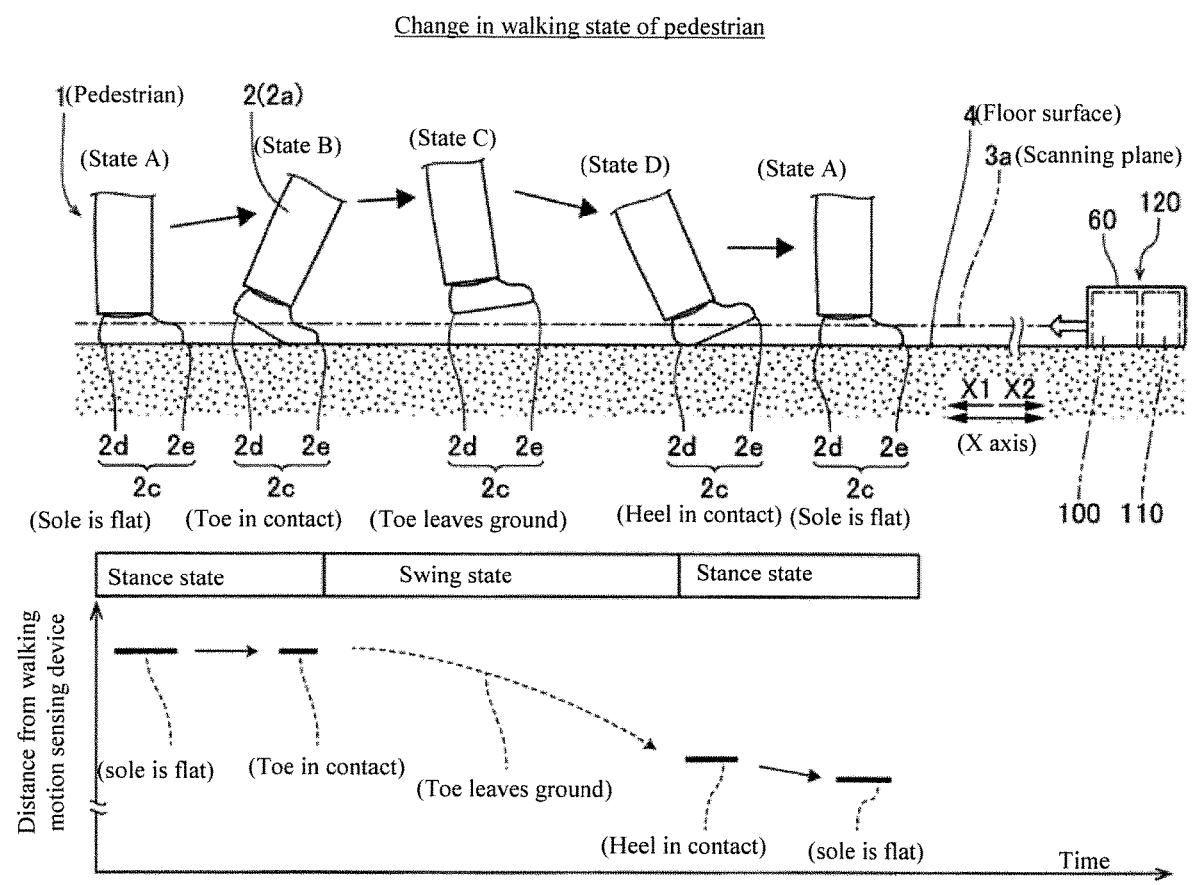
FIG. 5 is a schematic diagram for describing the walking motion of a pedestrian measured by the motion sensing device according to one or more embodiments of the present invention.

The motion sensing device 120 (in the two-dot chain line frame) according to one or more embodiments of the present invention, as illustrated in FIG. 2, is systematically configured by a laser measurement part 100 and a data analysis part 110. The laser measurement part 100 has a function for obtaining the state change (measurement data) of a pedestrian 1, described later, and the data analysis part 110 has a role of analyzing the walking state of the pedestrian 1 based on the measurement data (distance information) obtained by the laser measurement part 100. Furthermore, the motion sensing device 120 (in the two-dot chain line frame), as illustrated in FIG. 1 and FIG. 5, is used when detecting movement of a leg part 2 (right leg 2a and left leg 2b) of pedestrian 1 walking to the front (X1 side), by being placed on the floor surface 4. Therefore, by using the motion sensing device 120, it is configured so that the manner in which the pedestrian 1 is walking on the floor surface 4 can be quantitatively understood. First, the configuration of the laser measurement part 100 will be described below, and thereafter, the configuration of the data analysis part 110 will be described. Note that the leg part 2 of the pedestrian 1 is one example of the "target" in the scope of claims.

(Configuration of the Laser Measurement Part)

The laser measurement part 100, as illustrated in FIG. 1, has a function for detecting at a high resolution the state change (amount of change per unit time of movement speed and movement direction) such as the movement speed and movement direction (direction of walking) of the leg part 2 (right leg 2a and left leg 2b) when the pedestrian 1 is walking on the floor surface 4. That is, it is a measurement device for occasionally measuring the distance to the pedestrian 1 (right leg 2a and left leg 2b), and the movement speed and movement direction of the pedestrian 1, based on the "light reception time interval" and "light reception angle," which is the difference between when the laser emitted light 5 is emitted from the laser measurement part 100 and when the laser emitted light is reflected by the leg part 2 (right leg 2a and left leg 2b), becoming reflected light 6, and returns to the laser measurement part 100 at the time when a laser emitted light 5 is emitted from the laser measurement part 100. In this case, the laser emitted light 5 is two-dimensionally scanned (scan) in the center of the laser measurement part 100 at an angular range α (see FIG. 3) with respect to the scanning region 3 in the front (arrow X1 direction) of the laser measurement part 100. Also, it is configured so that the state change of the pedestrian 1 is detected due to the laser measurement part 100 receiving the reflected light 6 reflected by the leg part 2 (right leg 2a and left leg 2b) of the pedestrian 1. Note that the laser emitted light 5 is one example of the "light from the light source part" in the scope of claims. Furthermore, the angular range α is one example of the "angular range corresponding to the predetermined range" in the scope of claims.

Furthermore, the laser measurement part 100, as illustrated in FIG. 2, is provided with an LD (laser diode) part 10, a resonant scanner mirror part 20 (in the two-dot chain line frame), a light receiving part 40, and a main controller 90. In addition, these are housed in a housing 60 (see FIG. 1). The inside of the housing 60 is provided with an optical system 101 (in the two-dot chain line frame) for emitting a laser emitted light 5, and an optical system 102 (in the two-dot chain line frame) for receiving the reflected light 6. Furthermore, as illustrated in FIG. 1, a horizontally elongated rectangular opening 60a is provided on the front surface of the X1 side of the housing 60.

It is configured so that the laser emitted light 5 is emitted to the front (arrow X1 direction) via the opening 60a, and the reflected light 6 is incident on the optical system 102 (arrow X2 direction) via the opening 60a. Note that the LD part 10 is one example of the "light source part" in the scope of claims.

Figure 3:
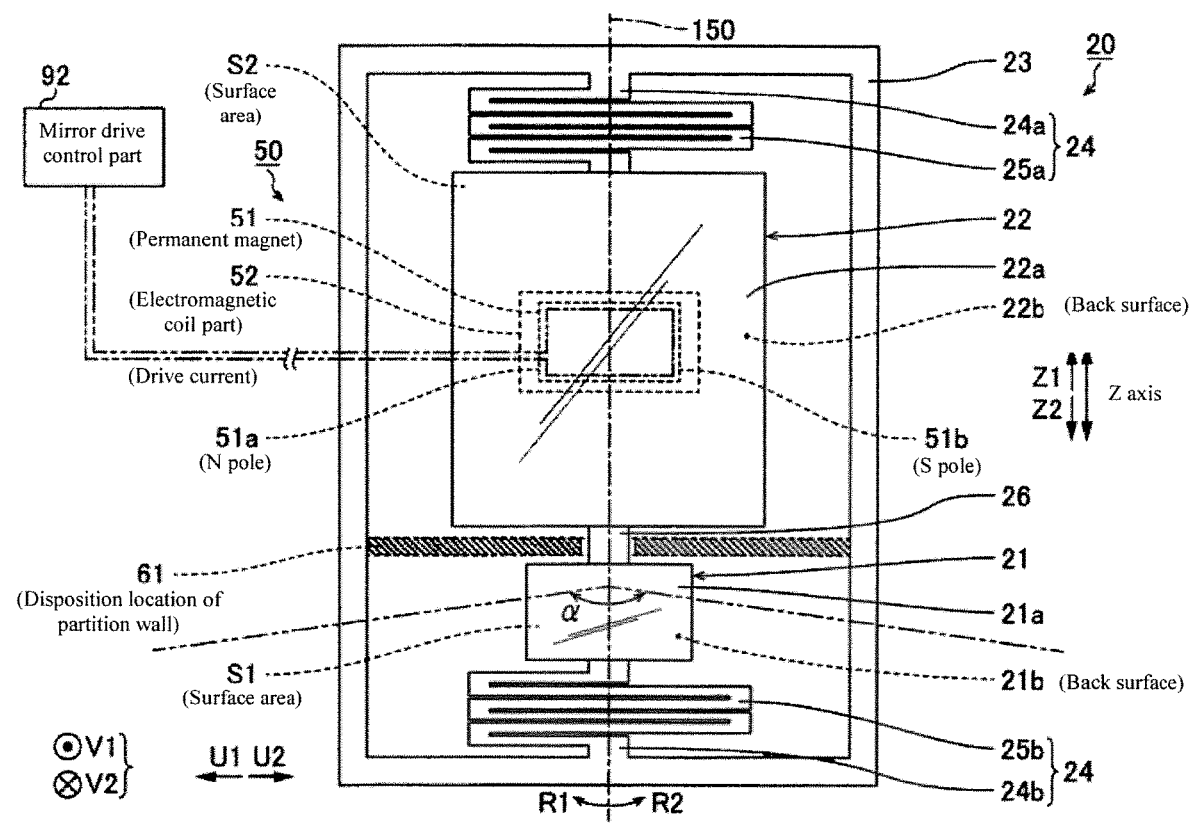
FIG. 3 is a planar view illustrating a configuration of a resonant scanner mirror part according to one or more embodiments of the present invention.

The LD part 10 has a function for emitting the laser emitted light 5. Furthermore, the resonant scanner mirror part 20, as illustrated in FIG. 3, includes a light transmitting mirror 21, a light receiving mirror 22, a frame-like support 23 for rockably supporting the light transmitting mirror 21 and the light receiving mirror 22, and a drive part 50 for swinging the light transmitting mirror 21 and the light receiving mirror 22. Note that the light transmitting mirror 21 and the light receiving mirror 22 is one example of the "first reflective part" and the "second reflective part" in the scope of claims, respectively.

Here, as illustrated in FIG. 2, the optical system 101 on the emission side includes a condenser lens 11, a light transmitting mirror 21, fixed mirrors 12 and 13, and light receiving parts 14 and 15. The light transmitting mirror 21 has a function for reflecting the laser emitted light 5 emitted from the LD part 10 and being made into parallel light by the condenser lens 11. Note that the light transmitting mirror 21 rocks in the arrow R1 direction and the arrow R2 direction around the swinging axis 150 based on the operation control of the drive part 50 using a mirror drive controller 92, described later. Thus, the light transmitting mirror 21 has a role of scanning (scan) the laser emitted light 5 within a scanning region 3 by the laser emitted light 5 being emitted from the laser measurement part 100 and the light transmitting mirror 21 itself being rocked. The emission intensity of the laser emitted light 5 emitted from the light transmitting mirror 21 is monitored by the fixed mirror 12 and the light receiving part 14, and the upper threshold of the scanning angle (optical scanning angle) of the laser emitted light 5 emitted from the light transmitting mirror 21 is monitored by the fixed mirror 13 and the light receiving part 15. Then, the electric signal from the light receiving parts 14 and 15 are fed back to the main controller 90. Thus, the calibration of the emission intensity of the laser emitted light 5 and the optical scanning angle is configured to always be carried out at a prescribed timing.

The light receiving mirror 22 has a function for receiving the reflected light 6 reflected by the pedestrian 1, and reflecting (guiding) it toward the light receiving part 40. Here, the optical system 102 on the light receiving side is configured by the light receiving mirror 22, a band pass filter (BPF) 31, and a condenser lens 32. The band pass filter 31 has a role for transmitting only a certain specific wavelength band from among the reflected light 6. The condenser lens 32 has a role for condensing the reflected light 6 transmitted through the band pass filter 31. Thus, the reflected light 6 from the light receiving mirror 22 is configured so as to be incident on the light receiving part 40 via the band pass filter 31 and the condenser lens 32.

The light receiving part 40 is composed of an avalanche photo diode (APD), and has a function for receiving the reflected light 6 from the light receiving mirror 22 and converting it into an electric signal. Note that, as illustrated in FIG. 1 and FIG. 2, a partition wall 61 for preventing the laser emitted light 5 emitted from the light transmitting mirror 21 from directly wrapping around the light receiving mirror 22, is provided between the light transmitting mirror 21 and the light receiving mirror 22 in the resonant scanner mirror part 20.

Here, as illustrated in FIG. 1, the partition wall 61 has a plate shape (flat plate shape) and a fan shape, and the partition wall 61 is disposed to extend in the horizontal direction (in the X-Y plane). Furthermore, two through holes 61a and 61b (illustrated by a broken line) extending in the thickness direction (Z axis direction) of the partition wall 61 are provided in the partition wall 61. The through hole 61a is disposed near the end portion on the Y1 side of the partition wall 61, and the through hole 61b is disposed near the end portion on the Y2 side of the partition wall 61. Note that one part of the laser emitted light 5 emitted from the light transmitting mirror 21 is guided to the light receiving part 14 via the through hole 61a after being reflected by the fixed mirror 12 (illustrated by a broken line). Furthermore, one part of the laser emitted light 5 emitted from the light transmitting mirror 21 is guided to the light receiving part 15 via the through hole 61b after being reflected by the fixed mirror 13 (illustrated by a broken line). Furthermore, the partition wall 61 prevents the laser emitted light 5 emitted from the light transmitting mirror 21 from wrapping around the light receiving mirror 2, while one part of the laser emitted light 5 is allowed to pass through the two through holes 61a and 61b to configure one part of the optical system for inspection of the laser emitted light 5. Furthermore, the housing 60 is configured to house the light transmitting mirror 21 and the light receiving mirror 22, and to be able to be placed on the floor surface 4.

Furthermore, as illustrated in FIG. 2, the main controller 90 has a role for managing the control processing of the laser measurement part 100. Furthermore, the laser measurement part 100 is provided with a laser driving part 91, a mirror driving controller 92, a signal processing part (distance calculation part 93), a memory part 94, and an interface (IF) part 95. These components are configured to operate and control based on the instructions of the main controller 90. Note that the signal processing part (distance calculation part) 93 is one example of the "measurement part" in the scope of claims.

The laser driving part 91 has a role for driving the LD part 10. Furthermore, the mirror driving controller 92 has a role for carrying out operation control of the drive part 50 of the resonant scanner mirror part 20 described later, and is configured so that the light receiving mirror 22 is driven along with the driving of the drive part 50. The signal processing part (distance calculation part) 93 has a role for calculating the distance to the pedestrian 1, movement speed, and movement direction (direction of presence) based on the electric signal converted by the light receiving part 40. More specifically, the signal processing part 93 is configured to calculate the amount of change per unit time of the distance to the pedestrian 1 based on the light reception time interval and the light reception angle (light reception position) of the reflected light 6 reflected from the pedestrian 1. That is, both the distance information to the pedestrian 1 and the amount of change per unit time of the distance to the pedestrian 1 are generated in the signal processing part 93 based on the light reception time interval and the light reception angle. This point will be described in detail later. Furthermore, a control program and the like executed by the main controller 90 is stored in the memory part 94. The IF part 95 has a role as the interface of the data analysis part 110 connected to the laser measurement part 100.

(Detailed Configuration of the Scanner Mirror Part)

As illustrated in FIG. 3, a metallic support 23 in the resonant scanner mirror part 20 is configured by a micro-electromechanical system (MEMS) technique. Furthermore, the support 23 has a swinging part 24 configured to be able to be twisted and deformed around a swinging axis 150, which is in the Z axis direction.

In detail, the swinging part 24 has a fixed part 24a formed on the end on the Z1 side in the Z axis direction and a fixed part 24b formed on the end on the Z2 side, a twisted part 25a extending in the arrow Z2 direction while reciprocating and meandering in the lateral direction (arrow U1 direction and arrow U2 direction) starting from the fixed part 24a, and a twisted part 25b extending in the arrow Z1 direction while reciprocating and meandering in the lateral direction (arrow U1 direction and arrow U2 direction) starting from the fixed part 24b. Furthermore, the swinging part 24, in addition to the aforementioned, has a connection part 26 extending in the Z axis direction to connect a portion on the opposite side (Z2 side) of the fixed part 24a of the twisted part 25a, and a portion on the opposite side (Z1 side) of the fixed part 24b of the twisted part 25b. Then, the twisted parts 25a and 25b configuring the meandering structure are configured so as to be able to be elastically deformed in the arrow V1 direction (toward the front of the page) and the arrow V2 direction (toward the back of the page) as a whole.

Furthermore, the back surface 21b of the light transmitting mirror 21 (back side of the page) and the back surface 22b of the light receiving mirror 22 (back side of the page) are both connected to the connection part 26. Furthermore, the light transmitting mirror 21 and the light receiving mirror 22 have a reflective film deposited on the surface of the thin glass plate material (front side of the page). Then, by the reflective film being deposited, the light transmitting mirror 21 and the light receiving mirror 22 have a reflective surface 21a and a light receiving surface 22a. Furthermore, in this case, the reflective surface 21a of the light transmitting mirror 21 is aligned within substantially the same plane as the light receiving surface 22a of the light receiving mirror 22. Furthermore, the surface area S2 of the light receiving surface 22a of the light receiving mirror 22 is larger than the surface area S1 of the reflective surface 21A of the light transmitting mirror 21 (surface area S2>surface area S1).

Here, in one or more embodiments of the present invention, as illustrated in FIG. 1, the resonant scanner mirror part 20 is installed in the housing 60 in a state in which the swinging axis 150 is aligned in the vertical direction (Z axis direction). Then, the light receiving mirror 21 is disposed on the lower side (Z2 side) in the Z axis direction in which the swinging part 24 in the resonant scanner mirror part 20 extends, and the light receiving mirror 22 is disposed on the upper side (Z1 side). Thus, the light receiving mirror 21 is disposed inside the housing 60 to be able to emit the laser emitted light 5 from the LD part 10 toward the scanning region 3 (scanning plane 3*a*) according to the region near the floor surface 4.

Furthermore, in one or more embodiments of the present invention, as illustrated in FIG. 3, the drive part 50 includes a permanent magnet 51 (illustrated by a broken line), and an electromagnetic coil part 52 for electromagnetic driving (illustrated by a broken line). The permanent magnet 51 adheres to the back surface 22*b* (back side of page) of the light receiving mirror 22. Then, the electromagnetic coil part 52 is disposed on the back side (back side of page) of the permanent magnet 51, having a prescribed interval therebetween. Furthermore, one end part 51*a* of the permanent magnet 51 (U1 side) has an N pole, and the other end part 51*b* (U2 side) has an S pole. Then, by the polarity of the electromagnetic coil part 52 being periodically switched by the mirror drive control part 92 at a prescribed frequency, it is configured so that a state where the N pole side of the permanent magnet 51 (one end part 51*a*) is attracted to the electromagnetic coil part 52, and a state where the S pole side of the permanent magnet 51 (other end part 51*b*) is attracted to the electromagnetic coil part 52 are alternately switched at a prescribed frequency (about 200 Hz).

Thus, the light receiving mirror 22 is configured to rock in the arrow R1 direction and the arrow R2 direction. Furthermore, by the twisted part 25*a* (twisted part 25*b*) having a meandering structure being provided between the fixed part 24*a* (fixed part 25*b*) and the connection part 26, the light transmitting mirror 21 fixed to the connection part 26 is also configured to integrally (synchronously) rock in the arrow R1 direction and arrow R2 direction around the single swinging axis 150 along with the swinging of the light receiving mirror 22. At this time, the laser measurement part 100 is configured so that the angular range α that the light transmitting mirror 21 and the light receiving mirror 22 rock in is about 90 degrees, and the light transmitting mirror 21 and the light receiving mirror 22 rock at a resonance frequency of about 200 Hz (including an error within +1%). Note that the light transmitting mirror 21 and the light receiving mirror 22 are both driven in a sinusoidal drive pattern.

Figure 4:
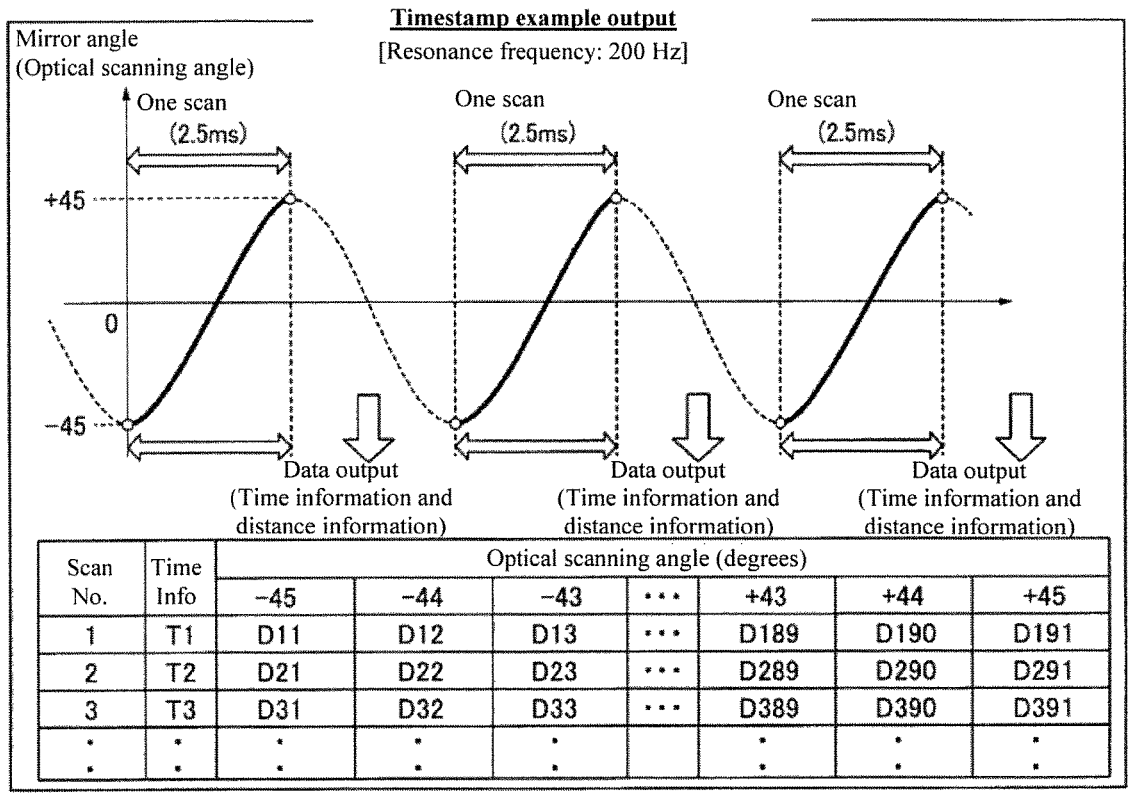
FIG. 4 is a diagram for describing the content of the data output in the gait measurement operation of a pedestrian carried out using the motion sensing device according to one or more embodiments of the present invention.

That is, as illustrated in FIG. 4, one scanning operation is carried out in about 5 milliseconds, wherein the optical scanning angle of the light transmitting mirror 21 (light receiving mirror 22) changes from "−45 degrees" to "+45 degrees" (the mechanical scanning angle is ±22.5 degrees). Furthermore, in one scanning operation, emission of the laser emitted light 5 and reflection of the reflected light 6 are repeated at intervals of "1 degree" of the scanning angle. In this case, when the light transmitting mirror 21 pivots in in one direction from "−45 degrees" to "+45 degrees" in the optical scanning angle, the laser emitted light 5 is emitted from the LD part 10 in 1-degree increments. Then, after the optical scanning angle reaches "+45 degrees," the laser emitted light 5 is not emitted, and it pivots to the position of "−45 degrees." Therefore, the distance calculation (distance measurement) to the leg part 2 of the pedestrian 1 using the signal processing part 93 (see FIG. 2) is carried out repeatedly at intervals of about 0.027 milliseconds, which is obtained by dividing the 2.5 milliseconds corresponding to half of the 200 Hz (5 milliseconds) into ninety-one laser emitted lights 5.

Furthermore, a phase difference system for measuring the phase difference of the continuous modulation wave (power modulation wave) is applied in the laser measurement part 100 as a measurement method of the distance to the pedestrian 1 using the signal processing part 93 based on the laser emitted light 5 and the reflected light 6. That is, from the speed of light ($3\times10^8$ m/s) and the flight time (delay time) of a single pulse light until the light (laser emitted light 5) emitted from the light source (LD part 10) is reflected by the target object (pedestrian 1) and reaches the sensor (light receiving part 40), unlike the TOF (Time of Flight) method (pulse count method) for obtaining the distance to the target object (pedestrian 1), it is configured so that the distance to the pedestrian 1 (amount of delay of the received light waveform with respect to the output waveform) can be obtained by measuring the phase difference (time difference) between the continuous emission waveform applied to the laser emitted light 5 and the received light waveform of the reflected light 6.

This is because the resonant scanner mirror part 20 rocks the light transmitting mirror 21 and the light receiving mirror 22 at a scanning speed of about 200 Hz, whereas in the TOF method, a faster processing circuit and a faster single pulse light are required in order to handle this scanning speed. On the other hand, in the case of the phase difference method, even if the emission waveform of the laser emitted light 5 remains set at a relatively low frequency, it is possible to measure the phase difference (time difference) between the continuous emission waveform of the laser emitted light 5 and the received light waveform of the reflected light 6. However, the partition wall 61 (see FIG. 1) for optically separating the light transmitting mirror 21 and the light receiving mirror 22 is required to prevent the emission waveform of the laser emitted light 5 from being added to the reflected light 6.

(Configuration of the Data Analysis Part)

Next, the data analysis part 110, as illustrated in FIG. 2, is provided with a storage means 111, a leg part discrimination (position detection) means 112, a distance change calculation means 113, a swing phase/stance phase discrimination means 114, a swing phase/stance phase transition period discrimination means 115, a heel contact and toe contact period discrimination means 116, a heel to toe direction vector calculation means 117, a gait analysis data output part 118, and an interface (IF) part 119. The data analysis part 110 has the role of one control part (calculation part) by the aforementioned components, and is configured to carry out gait analysis of the pedestrian 1 based on measurement data (distance information and time information) sent from the laser measurement part 100. In addition, the data analysis part 110 is configured so that a signal for operation control is also output to the main controller 90 of the laser measurement part 100. For example, the data analysis part 110 outputs a gain control signal for adjusting the gain with respect to the laser measurement part 100. That is, it is configured so that the laser measurement part 100 is operated in a state where the output gain of the laser emitted light 5 emitted from the LD part 10 and the amplitude gain of the input signal received by the light receiving part 40 are adjusted in advance. Note that the data analysis part 110 is one example of the "controller" in the scope of claims.

The storage means 111 has a role for temporarily keeping (storing) the measurement data (distance information) sent from the laser measurement part 100 via a transmission line 125 and the interface (IF) part 119, and for storing the analysis results after gait analysis is carried out by the data analysis part 110. The leg part discrimination means 112 has a role for discriminating whether the measurement data is the leg part 2 of the pedestrian 1 based on the measurement data (distance information) sent from the laser measurement part 100, and for detecting the position of the leg part 2 in the scanning plane 3a (see FIG. 5) on the floor surface 4. The distance changing calculation means 113 has a role for calculating the amount of distance change from the laser measurement part 100 to the leg part 2 per unit time based on the measurement data (distance information).

Furthermore, the swing phase/stance phase discrimination means 114 has a role for discriminating whether the state of the leg part 2 is in a swing phase (see FIG. 5) or a stance phase (see FIG. 5). Furthermore, the swing phase/stance phase transition period discrimination means 115 has a role for discriminating whether the state of the leg part 2 is in a period transitioning from the swing phase to the stance phase. The heel and toe contact period discrimination means 116 has a role for discriminating the period during which the leg part 2 is in a state where the toe is in contact with the ground (see FIG. 5) via a state where the heel is in contact with the ground (see FIG. 5). The heel and toe direction vector calculation means 117 has a role for calculating the progression direction of the toe when in a state where the toe is in contact with the ground via a state where the heel is in contact with the ground. The gait analysis data output part 118 has a role for outputting gait analysis data jointly determined based on each calculation method and discrimination means described above.

Note that the laser measurement part 100 is configured so that the time information (time stamp) of when the laser emitted light 5 is emitted from the light transmitting mirror 21 is applied each time the scanning operation is repeated. Specifically, as illustrated in FIG. 4, when the light transmitting mirror 21 pivots in one direction from "−45 degrees" to "+45 degrees" in the optical scanning angle, the laser emitted light 5 is emitted from the LD part 10 in 1-degree increments (about 0.027 millisecond intervals). Then, after the optical scanning angle reaches "+45 degrees," the laser emitted light 5 is not emitted, and it pivots to the position of "−45 degrees." The laser measurement part 100 is configured so that, when pivoting in one direction from "−45 degrees" to "+45 degrees," the time information (time stamp: T1, T2, T3, and the like) sequentially stored in the storage means 111 once one scanning operation is carried out, and the individual distance information (D11, D12, . . . , D91, and the like) to the pedestrian 1 based on the light received in the light receiving part 40 of the reflected light 6 are sent to the data analysis part 110. Note that the time information (time stamp) is one example of the "information of light reflected from the first reflective part toward the predetermined range" in the scope of claims. Furthermore, the distance information is one example of the "light reception information of the reflected light received by the light receiving part" in the scope of claims.

Then, in the laser measurement part 100, a single time information (time stamp) stored in the storage means 111, and 91 generated pieces of distance information are sent to the data analysis part 110 at the same time that one scanning operation is completed. Then, a new single time information and 91 pieces of distance information are sequentially and repeatedly sent to the data analysis part 110 at 5 millisecond intervals (about 200 Hz). In the data analysis part 110, the gait analysis of the pedestrian 1, described below, is carried out based on the time information and distance information (the amount of measurement information), which have a sufficient sampling number. Note that, the light reception time and light reception angle (optical scanning angle) information of the reflected light 6 received by the light receiving part 40 are included in the distance information as the light reception information.

Furthermore, the motion sensing device 120 configured by the aforementioned laser measurement part 100 and the data analysis part 110 is used as follows. Specifically, as illustrated in FIG. 5, the pedestrian 1 walks from the left side (X1 side) of the drawing toward the right direction (arrow X2 direction) in a state where the motion sensing device 120 is placed on the floor surface 4. Here, the walking state of the pedestrian 1 will be briefly described.

Consider a case where walking is started, for example, by stepping with the right leg 2a from a state A where the right leg 2a and left leg 2b (see FIG. 1) of the pedestrian 1 are in contact with the floor surface 4. First, the right leg 2a is in a "stance phase" state A where both the heel 2d and toe 2e of the foot sole 2c are in contact with the floor surface 4. Then, the right leg 2a transitions to a state where the heel 2d separates from the floor surface 4. Note that this state B is also included in the "stance phase" state. Then, it transitions to a "swing phase" state C where both the heel 2d and toe 2e separate from the floor surface 4. Thereafter, the right leg 2a transitions to a "stance phase" state D where the heel 2d is in contact with the floor surface 4. Then, after a slight time difference, it transitions to the "stance phase" state A where the entire sole 2c is in contact with the floor surface 4 due to the toe 2e also being in contact with the floor surface 4. Note that while the right leg 2a transitions in order of "stance phase," "swing phase," and "stance phase," the left leg 2b maintains a "stance phase" where the entire sole 2c contacted the floor surface 4.

Then, this time, in a state where the "stance phase" is maintained by the entire sole 2c of the right leg 2a being in contact with the floor surface 4, the left leg 2b (see FIG. 1) transitions in order of the aforementioned "stance phase," "swing phase," and "stance phase" (in order of state A, state B, state C, state D, and state A). Normally, the pedestrian 1 will walk in the arrow X2 direction by the right leg 2a and the left leg 2b repeatedly alternating this operation. Note that in the walking motion of the pedestrian 1, the transition period from state D to state A is extremely short with respect to the transition time from state A to state B, from state B to state C, and from state C to state D. That is, the time from the heel 2d contacting the ground to the toe 2e contacting the ground is extremely short. Furthermore, because the transition from state D to state A is the same "stance phase," this phenomenon occurs at a height slightly above the floor surface 4.

Then, when the motion sensing device 120 is operated in a state where the pedestrian 1 walks in the arrow X2 direction, it is configured so that the scanning plane 3a is formed where the laser emitted light 5 scans at a height slightly higher than the floor surface 4 (no less than about 15 mm and no more than about 20 mm). Furthermore, the scanning plane 3a is at a position higher than the floor surface 4 and lower than the height of the instep of the foot (leg part 2). Thus, the motion sensing device 120 is configured to sense each of state A, state B, state C, and state D. That is, when the reflected light 6 from the right leg 2a (or left leg 2b) is detected, it is configured to discriminate that it is in the "stance phase" state of state A, state B, or state D, and when the reflected light 6 is not detected, it is configured to discriminate that it is in the "swing phase" of state C. In addition, as described below, it is configured so that the transition from state D (state in which the heel is in contact with the ground), which occurs in the scanning plane 3a, to the subsequent state A (state in which the toe is in contact with the ground) is reliably discriminated.

Figure 6:
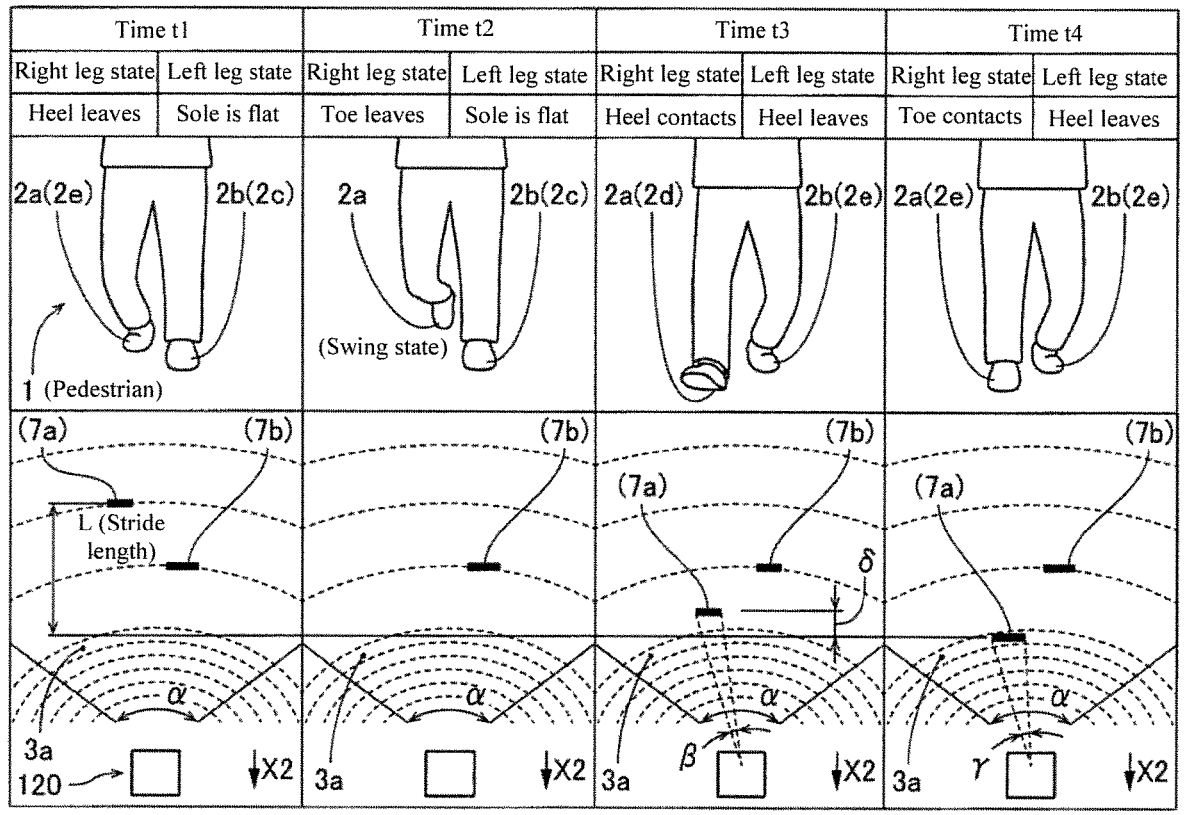
FIG. 6 is a schematic diagram for describing the walking motion of a pedestrian measured by the motion sensing device according to one or more embodiments of the present invention.

FIG. 6 illustrates the manner in which the pedestrian 1 walks toward the motion sensing device 120. FIG. 6 illustrates the transition to state B, state C, state D, and state A of the right leg 2a in FIG. 5 at each timing of time t1, time t2, time t3, and time t4. Then, the detection results of the walking state detected by the motion sensing device 120 at each timing is illustrated.

First, at the time t1 corresponding to the state B of FIG. 5, the toe 2e of the right leg 2a is detected as the point group 7a (thick solid line) and the left leg 2b is detected as the point group 7b (thick solid line). Furthermore, at the time t2 corresponding to the state C of FIG. 5, the right leg 2a disappears (is not detected), and the left leg 2b is detected as the point group 7b (thick solid line). Furthermore, at the time t3 corresponding to the state D of FIG. 5, the heel 2d of the right leg 2a is again detected as the point group 7a (thick solid line) and the left leg 2b is detected as the point group 7b (thick solid line). Furthermore, at the time t4 corresponding to the state A of FIG. 5, the toe 2e of the right leg 2a is detected as the point group 7a (thick solid line) and the left leg 2b is detected as the point group 7b (thick solid line).

The motion sensing device 120 is configured to be able to reliably discriminate the state of time t3 and the state of time t4 in FIG. 6 based on the time information and distance information where there is a sufficient sampling number, by resonating the resonant scanner mirror part 20 at about 200 Hz. That is, by carrying out gait analysis of the data analysis part 110, it is configured to be able to detect both the state D (see FIG. 5) in which the heel 2d of the left leg 2b is in contact with the floor surface 4, and the state A (see FIG. 5) in which the toe 2e of the left leg 2b, in addition to the heel 2d, is in contact with the floor surface 4, after a slight time difference (time t4 to time t3: about 0.3 to 0.5 seconds). That is, as described above, because the distance measurement using the signal processing part 93 (generation of both the distance information to the pedestrian 1 and the amount of change per unit time of the distance to the pedestrian 1) is repeated at intervals of about 0.027 milliseconds, even if it is only a slight time (not less than about 0.3 and not more than about 0.5 seconds) from state D (heel is in contact with ground state) in which the heel 2d is in contact with the floor surface 4 to state A (toe is in contact with ground state) in which the toe 2e of the left leg 2b, in addition to the heel 2d, is in contact with the floor surface 4, it is possible to sufficiently capture the state change amount δ (see FIG. 6) of these. Thus, not only is the state in which the pedestrian 1 simply walks in the arrow X2 direction detected, but it is configured to also reliably detect the rapid and detailed state change amount δ of the right leg 2a and the left leg 2b (movement speed and movement direction of pedestrian 1).

Furthermore, as made clear in FIG. 6, by scanning the laser emitted light 5 having an angular range α of about 90 degrees, the stride length L and the detailed movement direction (direction the right leg 2a and left leg 2b are carried) of the sole 2c of the pedestrian 1 can be understood. Note that for the detailed movement direction of the sole 2c, the amount of change is determined of the presence range (angular range β) of the heel 2d at time t3 and the presence range (angular range γ) of the toe 2e at time t4, based on the processing of the heel and toe direction vector calculation means 117 (see FIG. 2) in the data analysis part 110. Furthermore, by understanding in detail the movement direction of the stride length L and sole 2c, it can also be understood at which position (area) in the scanning region 3 the pedestrian 1 is walking. In this way, the motion sensing device 120 is configured in one or more embodiments of the present invention.

Note that although the analysis content of the general walking motion of the pedestrian 1 is exemplified as described above, it is possible to quantitatively evaluate the walking ability of the pedestrian 1 by analyzing the walking motion of the pedestrian 1 having, for example, an inconvenience in movement of the leg part 2 (right leg 2a and left leg 2b). In this case, it is also possible to take measures to prevent the pedestrian 1 from falling during rehabilitation based on the gait analysis results. Furthermore, examples of gait analysis of the target include: discrimination of the ease of tripping while walking, discrimination of a bow-legged gait and pigeon-toed gait, discrimination of a western style gait (walking with a propulsive force to kick backward) and a Japanese style gait (walking by trying to advance forward by only putting one leg forward), discrimination of gait analysis for footwear and a discrimination of the transition of the center of gravity position of the pedestrian 1 and ball of the foot contact by the contact timing of the foot, discrimination of the presence or absence of an abrasion gait (walking in a state where the foot does not rise), and the like. Furthermore, unlike the case where a large-scale measuring system is provided by installing a dedicated pressure sensor on a wide floor surface 4 for gait analysis, the motion sensing device 120 can be placed on the floor surface 4 at any place regardless of the observation location, and can measure the condition of carrying the leg part 2 near the floor surface 4 (condition of carrying the heel 2d and toe 2e) at a high resolution. Furthermore, it is possible to install the motion sensing device 120 on not only the floor surface 4, but also on a treadmill (health equipment for running and walking indoors) to carry out gait training while obtaining gait analysis data, thus, the range of applicability is very wide. Therefore, the utility value for using the motion sensing device 120 for gait analysis is very high.

One or more of the following effects may be obtained in one or more embodiments of the invention.

One or more embodiments of the present invention are provided with: a drive part 50 for swinging the light transmitting mirror 21 and the light receiving mirror 22 in an angular range α corresponding to the scanning region 3 according to the resonance from the electromagnetic drive force; and a measurement part 50 for storing the time information (time stamp) of the laser emitted light 5 reflected from the light transmitting mirror 21 towards the scanning region 3, and measuring the movement speed and movement direction of the leg part 2 (right leg 2a and left leg 2b) of the pedestrian 1, which is reflecting the light, based on the time information of the stored laser emitted light 5 and the light reception information (distance information) of the reflected light received by the light receiving part 40. Thus, for example, unlike the configuration in which the polygon mirror rotates using the rotation motor, the light transmitting mirror 21 and the light receiving mirror 22 can be reciprocally oscillated (rocked) at a high frequency (oscillation frequency) using resonance phenomenon by an electromagnetic driving force. Therefore, it is possible to understand the detailed movement (state change) of the leg part 2 (right leg 2a and left leg 2b) of the pedestrian 1 having a quicker movement while obtaining a sufficient sampling number (amount of measurement information) by the signal processing part 93. As a result, it is possible to provide a laser measurement part 100 having a resolution (ability to measure and identify physical quantities) compatible with gait analysis and the like.

Furthermore, in one or more embodiments of the present invention, the distance information is configured as light reception information so as to include the light reception time and the light reception angle (optical scanning angle) of the reflected light 6 received by the light receiving part 40. Thus, by effectively using the light reception time and the light reception angle (optical scanning angle) of the reflected light 6 received by the light receiving part 40, it is possible to accurately measure the movement speed and the movement direction of the leg 2 (right leg 2a and the left leg 2b) of the pedestrian 1, which reflects the light.

Furthermore, in one or more embodiments of the present invention, the light transmitting mirror 21 is disposed lower (Z2 side) in the vertical direction (Z axis direction) than the light receiving mirror 22. Thus, when measuring the movement of the leg 2 of the pedestrian 1 by placing the laser measurement part 100 on the floor surface 4 where the pedestrian 1 walks, it is possible to easily emit the laser emitted light 5 for scanning toward the scanning region 3 corresponding to a position slight higher than the floor surface 4. Therefore, it is possible to reliably measure the state change of the leg part 2 (detailed movement of the sole 2c of the right leg 2a and left leg 2b) of the pedestrian 1 moving quickly near the floor surface 4.

Furthermore, in one or more embodiments of the present invention, the angular range α for swinging the light transmitting mirror 21 and the light receiving mirror 22 is set to about 90 degrees, and the resonance frequency of the light transmitting mirror 21 and the light receiving mirror 22 is set to about 200 Hz. Thus, it is possible to reliably measure the state change of the leg part 2 of the pedestrian 1, which is quick and detailed in movement. That is, the motion sensing device 120 can be widely used not only for detailed movement of the leg part 2 (sole 2c of the right leg 2a and left leg 2b) of the pedestrian 1, but also for measurement of a state change of these target objects to be measured requiring a higher resolution, such as for detecting the presence or absence of invasion of a small animal (vermin) in a specific area.

Furthermore, in one or more embodiments of the present invention, the LD part 10 is disposed on the side of the light transmitting mirror 21. Thus, it is possible to reduce the dimension in the height direction of the laser measurement part 100 compared to a case where the LD part 10 is disposed above (arrow Z1 direction) the light transmitting mirror 21. Thus, when measuring the movement of the leg part 2 of the pedestrian 1 by placing the laser measurement part 100 on the floor surface 4 where the pedestrian 1 walks, it is possible to dispose the LD part 10 and the light transmitting mirror 21 at a height closer to the floor surface 4. Therefore, it is possible set the scanning region 3 (scanning plane 3a) to a low position, so as to easily measure the detailed movement of the leg part 2 (sole 2c of the right leg 2a and left leg 2b) of the pedestrian 1 moving quickly near the floor surface 4.

Furthermore, one or more embodiments of the present invention is configured so that the light transmitting mirror 21 and the light receiving mirror 22 are integrally rocked around the single swinging axis 150. Also, the drive part 50 is configured so that the light receiving mirror 22 is caused to resonate by the electromagnetic drive force. Thus, the light transmitting mirror 21 can be easily rocked around the single swinging axis 150 synchronously with the swinging (driving or rocking) of the light receiving mirror 22 by the electromagnetic drive force. Furthermore, because it is not necessary to individually provide a swinging shaft for the light transmitting mirror 21 and a swinging shaft for the light receiving mirror 22, an increase in number of components of the motion sensing device 120 can be suppressed, and the configuration of the motion sensing device 120 can be simplified.

Furthermore, in one or more embodiments of the present invention, the surface area S2 of the light receiving surface 22a of the light receiving mirror 22 is configured to be larger than the surface area S1 of the reflective surface 21a of the light transmitting mirror 21. Thus, the reflected light 6 reflected from the pedestrian 1 existing in the scanning region 3 (scanning plane 3a) can be reliably received by the light receiving mirror 22 having a relatively large surface area, and it can be reliably reflected (guided) to the light receiving part 40.

Furthermore, in one or more embodiments of the present invention, the light receiving mirror 21 is disposed inside the housing 60 to be able to emit the laser emitted light 5 from the LD part 10 toward the scanning region 3 composing to the region near the floor surface 4. Thus, by only placing the housing 60 on the floor surface 4, it is possible to easily emit the laser emitted light 5, which is the light for scanning, toward the scanning region 3 (scanning plane 3a) corresponding to a position slightly higher than the floor surface 4.

Furthermore, one or more embodiments of the present invention are provided with a partition wall 61 provided between the light transmitting mirror 21 and the light receiving mirror 22 to prevent the laser emitted light 5 from the light transmitting mirror 21 from wrapping around the light receiving mirror 22. Then, the through holes 61a and 61b are provided in the partition wall 61 extending along the thickness direction of the partition wall 61 for respectively guiding a part of the laser emitted light 5 emitted from the light transmitting mirror 21 to the light receiving part 14 and 15. Thus, because only the specific laser emitted light 5 can be guided to the light receiving parts 14 and 15 via the through holes 61a and 61b provided in the partition wall 61, it is possible to configure the optical system 101 on the laser emitted light 5 side by effectively using the partition wall 61 while preventing the laser emitted light 5 emitted from the light transmitting mirror 21 from entering into the light receiving mirror 22 due to the partition wall 61.

Furthermore, in one or more embodiments of the present invention, the signal processing part 93 is configured to obtain the amount of change per unit time of the distance to the pedestrian 1 based on the light reception time interval and the light reception angle of the reflected light 6 reflected from the pedestrian 1. Thus, it is possible to understand the movement speed, the movement direction, and the like of the leg part 2 (sole 2c of the right leg 2a and the left leg 2b) of the pedestrian 1 having a high accuracy.

Furthermore, in one or more embodiments of the present invention, the signal processing part 93 is configured to be able to discriminate that stance phase state (state A, B, and D) in which the sole 2c of the leg part 2 of the pedestrian 1 is in contact with the ground while walking, and the swing phase state (state C) in which the sole 2c moves above the floor surface 4. Thus, for example, it is possible to detect both a case where the laser emitted light 5 from the light transmitting mirror 21 becomes the reflected light 6 reflected by the leg part 2 of the pedestrian 1 and is then received, and a case where the reflected light 6 is not received based on the light reception time interval and the light reception angle of the reflected light 6 received by the light receiving part 40.

Therefore, it is possible to easily discriminate the stance phase state (state A, B, and D) in which the sole 2c of the leg part 2 of the pedestrian 1 is in contact with the ground while walking, and the swing phase state (state C) in which the sole 2c moves above the floor surface 4. Thus, it is possible to reliably understand (quantitatively understand) the entire walking motion (walking manner) of the pedestrian 1 even when using the motion sensing device 120 for emitting scanning light (laser emitted light 5) to the scanning region 3 corresponding to a position slightly higher than the floor surface 4.

Furthermore, in one or more embodiments of the present invention, the signal processing part 93 is configured to be able to discriminate the heel contact state D in which the heel 2d is in contact with the floor surface 4 in the sole 2c when transitioning from the swing phase state (state C) to the stance phase state (state A), and the toe contact state A in which the toe 2e is in contact with the ground in the sole 2c after the heel contact state. Thus, it is possible to detect both the heel contact state D and the toe contact state A occurring at a time slightly thereafter, based on the light reception time interval and the light reception angle of the reflected light 6 received by the light receiving part 40. Therefore, it is possible to observe in detail (quantitatively understand) the walking manner of pedestrian 1.

Next, one or more embodiments will be described with reference to FIG. 2 and FIG. 7. In one or more embodiments, an example will be described configuring a motion sensing device 220 for adjusting the emission strength of the laser emitted light 5 and the light reception sensitivity of the reflected light 6 depending on the distance between the pedestrian 1 and the laser measurement part 200. Note that the same components discussed above in the drawings will be denoted by the same reference symbols. Note that the motion sensing device 220 is one example of the "laser device" in the scope of claims.

The motion sensing device 220 (see FIG. 1) according to one or more embodiments of the present invention is provided with a laser measurement part 200 and a data analysis part 210. Furthermore, the motion sensing device 220, as illustrated in FIG. 7, is configured so as to be able to also understand a state in which the pedestrian 1 moves sequentially to a position P2 (second step area), position P3 (third step area), and position P4 (fourth step area) from a state in which the pedestrian 1 is walking at position P1 (first step area), which is relatively far from the motion sensing device 220, using the data analysis part 210. Note that specificity of the movement area leading to positions P1 to P4 correspond each step (1 step) of the leg part 2 (right leg 2a and left leg 2b) of the pedestrian 1. Note that this point is the same in the data analysis part 110 discussed above. Note that the data analysis part 210 is one example of the "controller" in the scope of claims.

Here, the motion sensing device 220 in one or more embodiments of the present invention is configured so that the output gain of the laser emitted light 5 (see FIG. 2) emitted from the LD part 10 (see FIG. 2) and the amplitude gain of the input signal received by the light receiving part 40 (see FIG. 2) can be respectively adjusted according to the movement speed and the movement direction of the pedestrian 1.

Figure 7:
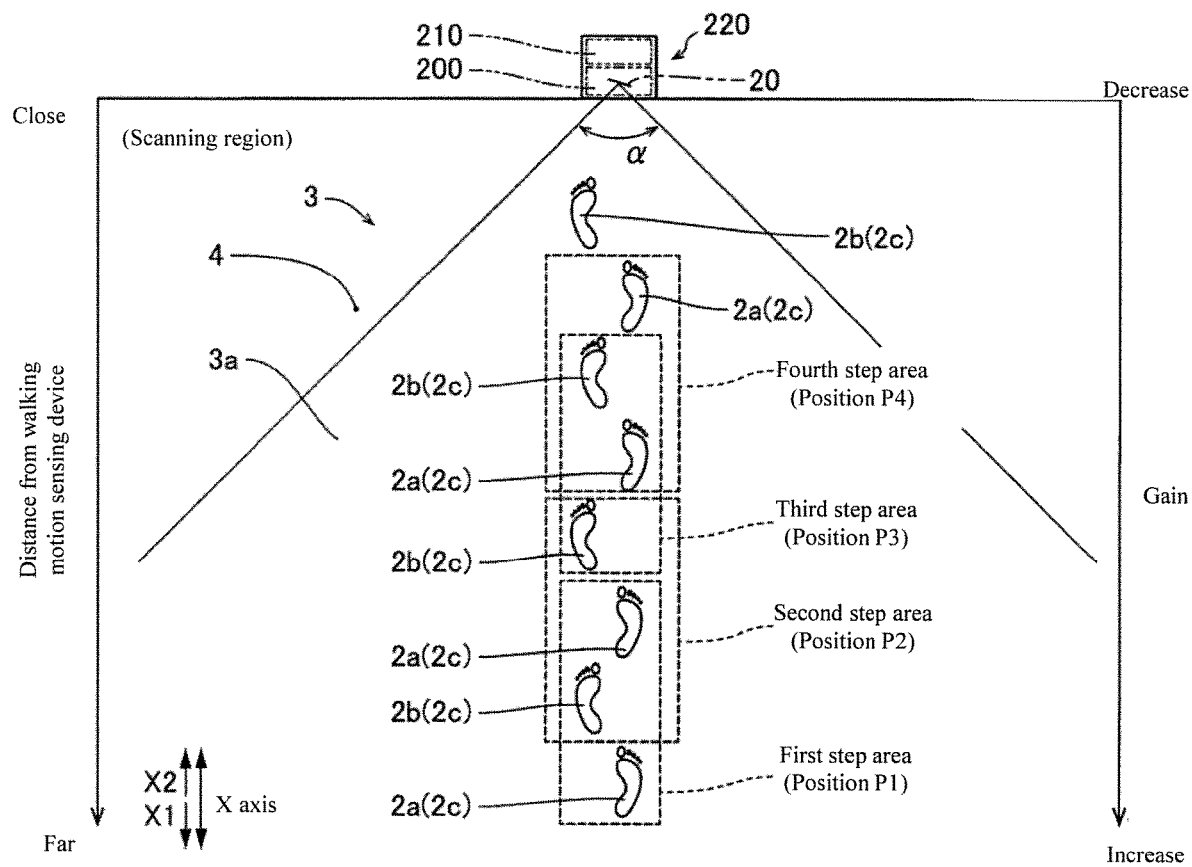
FIG. 7 is a schematic diagram for describing the content of the gait measurement operation of a pedestrian carried out using the motion sensing device according to one or more embodiments of the present invention.

That is, as illustrated in FIG. 7, the output gain of the laser emitted light 5 emitted from the LD part 10 (see FIG. 1) and the amplitude gain of the input signal received by the light receiving part 40 (see FIG. 1) when the pedestrian 1 is walking at position P1, which is relatively far from the motion sensing device 220, can be adjusted to be relatively large. On the other hand, the output gain of the laser emitted light 5 emitted from the LD part 10 and the amplitude gain of the input signal received by the light receiving part 40 when the pedestrian 1 is sequentially walking at position P2, which is relatively close to the motion sensing device 220, can be adjusted to be relatively small. Furthermore, the output gain and the amplitude gain can be adjusted to increase step by step as the motion sensing device 220 is approached from position P1 to P2, from position P2 to P3, and from position P3 to P4.

Thus, the output gain and the amplitude gain can be adjusted for each state change (moving from position P1 to P4) of pedestrian 1. Thus, it is configured so that the measurement sensitivity of the laser measurement part 200 at position P1 becomes relatively high, and the measurement sensitivity of the laser measurement part 200 at position P4 becomes relatively small. Note that the positions P1 and P2, positions P2 and P3, and positions P3 and P4, respectively, are one example of the "first distance" and the "second distance" in the scope of claims. Note that the other configurations of the motion sensing device 220 are the same as the aforementioned embodiments.

In one or more embodiments of the present invention, as described above, the data analysis part 210 is configured to adjust the output gain of the laser emitted light 5 emitted from the LD part 10 based on the movement speed and the movement direction of the pedestrian 1. Thus, because the amount of laser emitted light 5 emitted from the LD part 10 can be appropriately adjusted by the data analysis part 210 according to the distance from the motion sensing device 220 to the pedestrian 1 while moving, it is possible to emit the laser emitted light 5 towards the scanning region 3 under optimal conditions according to the distance from the motion sensing device 220 to the pedestrian 1. Therefore, the measurement accuracy (sensitivity) of the detailed movement of the leg part 2 (right leg 2a and left leg 2b) of the pedestrian 1 can be maintained to be high.

Furthermore, in one or more embodiments of the present invention, the data analysis part 210 is configured so as to adjust the amplitude gain of the input signal received by the light receiving part 40 based on the movement speed and the movement direction of the pedestrian 1. Thus, because the amplitude gain of the input signal received by the light receiving part 40 can be appropriately adjusted by the data analysis part 210 according to the distance from the motion sensing device 220 to the pedestrian 1 while moving, it is possible to receive the light reflected from the pedestrian 1 under optimal conditions according to the distance from the motion sensing device 220 to the pedestrian 1. Therefore, the measurement accuracy (sensitivity) of the detailed movement of the leg part 2 (right leg 2a and left leg 2b) of the pedestrian 1 can be maintained to be high.

Furthermore, in one or more embodiments of the present invention, the data analysis part 210 is configured so as to adjust both the output gain and the amplitude gain for each state change of one step (a single step) of the pedestrian 1. Thus, it is possible to understand the state change of the pedestrian 1, which is quick and detailed in movement, having a high measurement accuracy (sensitivity).

Furthermore, in one or more embodiments of the present invention, the output gain and amplitude gain when the distance to the pedestrian 1 is position P1 is configured to be greater than the output gain and amplitude gain, respectively, when the distance to the pedestrian 1 is position P2 (P3, P4), which is closer than position P1. Thus, the output gain and the amplitude gain can be increased as the distance from the laser measurement part 200 to the pedestrian 1 increases. On the other hand, the output gain and the amplitude gain can be decreased as the distance from the laser measurement part 200 to the pedestrian 1 decreases. As a result, it is possible to maintain the measurement accuracy (sensitivity) of the laser measurement device 200 at a constant level regardless of distance to the pedestrian 1. Note that, other effects previously described in the aforementioned embodiments may also be achieved.

Next, one or more embodiments of the present invention will be described with reference to FIG. 1, FIG. 2, FIG. 8, and FIG. 9. In one or more embodiments, an example will be described configuring a motion sensing device 320 so that the time information (time stamp) of when the laser emitted light 5 is emitted from the light transmitting mirror 21 is applied for each "1 degree" in the unit swinging angle (optical scanning angle) of the light transmitting mirror 21. Note that the same components discussed above in the drawings will be denoted by the same reference symbols. Furthermore, the unit swinging angle (1 degree) is one example of the "predetermined swinging angle" in the scope of claims. Furthermore, the motion sensing device 320 is one example of the "laser device" in the scope of claims.

The motion sensing device 320 (see FIG. 1) according to one or more embodiments of the present invention is provided with a laser measurement part 300 and a data analysis part 310 Then, the laser measurement part 300 is configured so that the time information (time stamp) of when the laser emitted light 5 is emitted from the light transmitting mirror 21 is applied for each "1 degree," which is the unit swinging angle of the light transmitting mirror 21.

Figure 8:
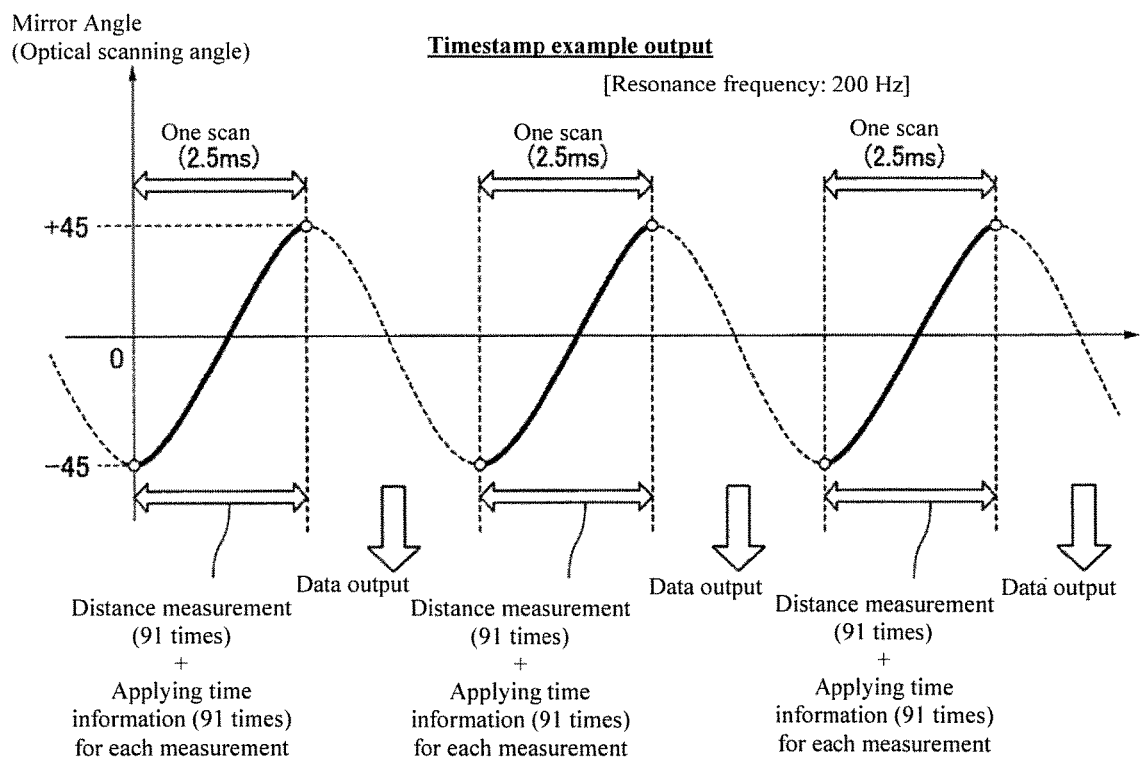
FIG. 8 is a diagram for describing the content of the data output in the gait measurement operation of a pedestrian carried out using the motion sensing device according to one or more embodiments of the present invention.

Specifically, as illustrated in FIG. 8, when the light transmitting mirror 21 pivots in one direction from "−45 degrees" to "+45 degrees" in the optical scanning angle, the laser emitted light 5 is emitted from the LD part 10 in 1-degree increments (about 0.027 millisecond intervals). Then, after the optical scanning angle reaches "+45 degrees," the laser emitted light 5 is not emitted, and it pivots to the position of "−45 degrees." The laser measurement part 300, is configured so that when it pivots in a single direction from "−45 degrees" to "+45 degrees," in addition to the distance information to the pedestrian 1 based on the light received in the light receiving part 40 of the reflected light 6, the time information, wherein the laser emitted light 5 is emitted, is sent to the data analysis part 310 each time the laser emitted light 5 is emitted from the LD part 10 (at about 0.027 millisecond increments) That is, the light reception time of the reflected light 6 received by the light receiving part 40 (=emission time information +0.027 milliseconds) and the optical scanning angle are included in the individual distance information.

Thus, it is configured so that the data as illustrated in FIG. 9, is sequentially accumulated in the storage means 111 of the data analysis part 310. That is, it is configured so that the time information "T203" at a second scanning number and a scanning angle of "−43 degrees" is linked to the data "D23:T203" exemplified as the "data configuration example" in FIG. 9. Such data (time stamp) is generated for each number of scan in the laser measurement part 300, and is sent to the data analysis part 310.

Note that because the light transmitting mirror 21 rocked at about 200 Hz (including an error within +1%) is driven in a sinusoidal wave pattern, even when the optical scanning angle is in 1-degree increments, the time information, wherein the laser emitted light 5 is emitted, is not a time obtained by simply dividing 2.5 milliseconds by ninety-one (half of 200 Hz (5 milliseconds)). That is, the time (for example, each time information from "T101" to "T191" in the first scan) for which the light transmitting mirror 21 driven in a sinusoidal drive pattern passes through each pivot angle when pivoting in 1-degree increments, is determined by a calculation based on the coefficients of a sinusoidal wave table prepared in advance. Then, the laser emitted light 5 is emitted from the LD part 10 at each timing "T101" to "T191," and the distance information to the pedestrian 1 based on the light received in the light receiving portion 40 of the reflected light 6 and each time information "T101" to "T191" are linked to each other in a one-to-one correspondence.

Also, the data analysis part 310 is configured so that the state change of the pedestrian 1 is measured at a high resolution (ability to measure and identify physical quantities) based on the data illustrated in FIG. 9. Note that the other configurations of the motion sensing device 320 are the same as the aforementioned embodiments.

In one or more embodiments of the present invention, as described above, it is configured so that the time information of when the laser emitted light 5 is emitted from the light transmitting mirror 21 toward the scanning region 3 is applied for each "1 degree," which is the unit swinging angle of the light transmitting mirror 21. Also, the signal processing part 93 of the laser measurement part 300 is configured so as to measure the state change of the pedestrian 1 based on the light reception time interval and the light reception angle of the reflected light 6 received by the light receiving part 40. Thus, because the information of the light reflected from the light transmitting mirror 21 to the scanning region 3 can be configured based on the time information (time stamp) of the light for each 1 degree in the unit swinging angle (optical scan angle) of the light transmitting mirror 21, the movement speed and the movement direction of the leg part 2 (right leg 2a and left leg 2b) of the pedestrian 1, which reflects the light, can be accurately measured based on the time information of the light for each 1 degree in the unit swinging angle (optical scan angle) of the light transmitting mirror 21 and the light reception information of the reflected light received by the light receiving part 40. That is, compared to when the time information (time stamp) is only applied once for one scanning operation, the movement of the leg part 2 (sole 2c of the right leg 2a and the left leg 2b) can be reliably measured in detail based on the 91 pieces time information (time stamp) applied at each 1 degree, which is the unit swinging angle during one scanning operation. That is, gait analysis of the pedestrian 1 can be carried out with high accuracy based on the acquisition of more sampling numbers (amount of measurement information) than in the embodiments discussed above. Note that, the other effects are the same as the aforementioned embodiments.

One or more embodiments of the present invention herein disclosed are to be considered as illustrative and not restrictive in all points. The scope of the present invention is illustrated by the scope of claims rather than the aforementioned embodiments, and furthermore, all changes (variations) within the meaning and scope equivalent to the scope of claims are included.

For example, in one or more embodiments of the present invention, the angular range α at which the light transmitting mirror 21 and the light receiving mirror 22 rock are set to about 90 degrees, but the present invention is not limited to this. For example, the resonant scanner mirror part 20 may be configured so that the angular range α is set to any angular range α that is not less than 90 degrees and is not more than 110 degrees.

Furthermore, in one or more embodiments of the present invention, the resonance frequency of the light transmitting mirror 21 and the light receiving mirror 22 is set to about 200 Hz, but the present invention is not limited to this. For example, the resonant scanner mirror part 20 (drive part 50) may be configured so that the resonance frequency is set to any resonance frequency that is not less than 100 Hz and is not more than 500 Hz.

Furthermore, in one or more embodiments of the present invention, the drive part 50 is configured by a permanent magnet 51 and an electromagnetic coil part 52 that causes the permanent magnet 51 to rock using an electromagnetic force. For example, a piezoelectric body (a piezoelectric element causing expansion and contraction on the V1 side and V2 side depending on the polarity when a voltage is applied) may be incorporated into the portion of the twisted portions 25a and 25b having a meandering structure. Also, the resonant scanner mirror part 20 may be configured so that the light transmitting mirror 21 and the light receiving mirror 22 held by the connection part 26 are rocked within a prescribed angular range by a voltage controlled by a prescribed pattern being applied to the piezoelectric body.

Furthermore, in one or more embodiments of the present invention, the permanent magnet 51 is attached to the back surface 22b of the light receiving mirror 22 and the electromagnetic coil part 52 is disposed opposite to the back side of the permanent magnet 51, but the present invention is not limited to this. That is, the drive part 50 may be configured by having the electromagnetic coil 52 wrapped around the support 23 is provided inside the light receiving mirror 22, and a pair of permanent magnets 51 disposed at prescribed distance intervals on both side ends of the light receiving mirror 22 (U1 side and U2 side in FIG. 3).

Furthermore, in one or more embodiments of the present invention, the resonant scanner mirror part 20 is configured so that the reflective surface 21a of the light transmitting mirror 21 is aligned within substantially the same plane as the light receiving surface 22a of the light receiving mirror 22, but the present invention is not limited to this. In the present invention, the reflective surface 21a of the light transmitting mirror 21 and the light receiving surface 22a of the light receiving mirror 22 may not be aligned in substantially the same plane.

Furthermore, in one or more embodiments, the present invention is applied to the resonant scanner mirror part 20 in which the optical scanning angle is set to "±45 degrees" (mechanical scanning angle is ±22.5 degrees), but the present invention is not limited to this. The present invention may be applied to a resonant scanner mirror part in which the mechanical scanning angle is set to a mechanical scanning angle other than ±22.5 degrees.

Furthermore, in one or more embodiments of the present invention, the data analysis part 210 is configured so that both the output gain of the laser emitted light 5 emitted from the LD part 10 and the amplitude gain of the input signal received by the light receiving part 40 are adjusted, but the present invention is not limited to this. For example, the data analysis part 210 may be configured so that either the output gain of the laser emitted light 5 or the amplitude gain of the input signal received by the light receiving part 40 is adjusted.

Furthermore, in one or more embodiments of the present invention, the data analysis part 210 is configured so that both the output gain of the laser emitted light 5 and the amplitude gain of the input signal received by the light receiving part 40 are adjusted according to the walking position (position P1 to P4) of the pedestrian 1, but the present invention is not limited to this. For example, the data analysis part 210 may be configured so that at least one of either the output gain of the laser emitted light 5 or the amplitude gain of the input signal received by the light receiving part 40 is adjusted for each one scanning operation of the laser emitted light 5 emitted from the resonant scanner mirror part 20.

Furthermore, in one or more embodiments of the present invention, the motion sensing device 120 (220, 320) is configured having the laser measurement part 100 (200, 300) and the data analysis part 110 (210, 310) housed in a single housing 60, but the present invention is not limited to this. For example, the laser measurement part 100 (200, 300) may be configured as a single unit, and the data analysis part 110 (210, 310) may be provided in a PC (personal computer) or a mobile terminal. Also, the motion sensing device 120 (220, 320) may be configured by connecting a PC or mobile terminal wirelessly or by wire to the laser measurement part 100 (200, 300).

The components discussed above may be applicable to a medical device. For example, a medical device having similar components as the aforementioned walking motion sensing device 120 (220, 320) may measure a distance to a patient and a walking direction of the patient; performs gait analysis on that person; and determine whether he has recovered from gait impairment.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SYMBOLS

1 Pedestrian
2 Leg part (target)
2a Right leg
2b Left leg
2c Sole
2d Heel
2e Toe
3 Scanning region
3a Scanning plane
4 Floor
5 Laser emitted light (light from light source part)
6 Reflected light
10 LD part (light source part or light source)
14, 15 Light receiving part
20 Resonant scanner mirror part
21 Light transmitting mirror (first reflective part or first reflector)
22 Light receiving mirror (second reflective part or second reflector)
23 Support
24 Swinging part
40 Light receiving part (light receiver)
50 Drive part (driver)
51 Permanent magnet
52 Electromagnetic coil part
60 Housing
61 Partition wall
61a, 61b Through hole
90 Main controller
93 Signal processing part (measurement part or calculator)
100, 200, 300 Laser measurement part 110, 210, 310 Data analysis part (controller)
120, 220, 320 Motion sensing device (laser device)
150 Swinging axis
P1, P2, P3, P4 Position (first distance, second distance)
α Angular range (angular range corresponding to the predetermined range)

What is claimed is:

1. A laser device, comprising:
a light source that emits light;
a first reflector that reflects the light toward a measurement target area;
a second reflector that reflects the light reflected from the measurement target area;
a light receiver that receives the light reflected by the second reflector;
a driver that swings the first and the second reflectors in an angular range corresponding to the measurement target area;
a calculator that:
stores first information about the light reflected by the first reflector toward the measurement target area and second information about the light received by the light receiver; and
measures movement speed and movement direction of a target reflecting the light from the first reflector based on the first and the second information; and
a controller that performs gait analysis based on the first and the second information, wherein
the first reflector and the second reflector swing integrally.

2. The laser device according to claim 1, wherein the second information includes a light reception time and a light reception angle of the light received by the light receiver.

3. The laser device according to claim 1, wherein the calculator stores third information about time stamp of the light reflected by the first or the second reflector for each predetermined swinging angle of the first or the second reflector.

4. The laser device according to claim 3, wherein the time stamp is generated every time when the first or the second reflector swing one degree.

5. The laser device according to claim 4, wherein the time stamp follows at least one of: a total number of scans and a unique number that represents a swinging angle of the first or the second reflector.

6. The laser device according to claim 1, further comprising a controller that controls an amount of the light emitted from the light source based on the movement speed and the movement direction of the target.

7. The laser device according to claim 6, wherein the controller controls sensing conditions based on an irradiation range of light for the measurement target area.

8. The laser device according to claim 1, further comprising a controller that controls an amount of signal to be received by the light receiver based on the movement speed and the movement direction of the target.

9. The laser device according to claim 6, wherein the controller carries out at least one of:
controlling the amount of the light when a distance to the target is a first distance to be greater than the amount of light when the distance to the target is a second distance that is smaller than the first distance; and
controlling an amount of signal to be received by the light receiver when the distance to the target is the first distance to be greater than a signal based on the received light when the distance to the target is the second distance.

10. The laser device according to claim 1, wherein a swinging angular range of the first and the second reflector is 90 degrees or greater, and a resonance frequency of the first and the second reflector is no less than 100 Hz and is no greater than 500 Hz.

11. The laser device according to claim 1, wherein the controller receives from the calculator third information about time stamp of the light reflected by the first or the second reflector for each predetermined swinging angle of the first or the second reflector and fourth information about a distance between the laser device and the target in a predetermined frequency.

12. The laser device according to claim 11, wherein the predetermined frequency is substantially 200 Hz.

13. The laser device according to claim 1, wherein
the first and second reflectors swing around an axis that extends vertically, and
the first reflector is disposed below the second reflector.

14. A method comprising:
emitting light from a light source;
reflecting by a first reflector the light toward a measurement target area;
reflecting by a second reflector the light reflected from the measurement target area;
receiving the light reflected by the second reflector;
measuring movement speed and movement direction of a target reflecting the light reflected by the first reflector based on first information about the light reflected by the first reflector and second information about the received light; and
performing gait analysis based on the first and the second information, wherein
the first reflector and the second reflector are swung integrally in an angular range corresponding to the measurement target area.

* * * * *